United States Patent
Standish et al.

[19]

[11] Patent Number: 5,934,613
[45] Date of Patent: Aug. 10, 1999

[54] SEALING FOR A PIVOTING DOOR REVERSER

[75] Inventors: Robert R. Standish, Gazeran; Alain Fournier, Le Plessis Robinson, both of France

[73] Assignee: Societe de Construction des Avions Hurel-Dubois (societe anonyme), Meudon la Foret, France

[21] Appl. No.: 08/637,477

[22] Filed: Apr. 25, 1996

[30] Foreign Application Priority Data

Feb. 8, 1996 [EP] European Pat. Off. ............ 96 400264

[51] Int. Cl.⁶ ................................. F02K 1/00; F02K 1/12
[52] U.S. Cl. ................................... 244/110 B; 244/23 D; 60/226.2; 60/230; 239/265.23
[58] Field of Search ........................... 244/110 B, 12.5, 244/23 D; 60/226.1, 226.2, 230; 239/265.19, 265.23, 265.25, 265.27, 265.29, 265.31, 265.37

[56] References Cited

U.S. PATENT DOCUMENTS

| | | | |
|---|---|---|---|
| 4,005,822 | 2/1977 | Timms | 244/110 B |
| 4,182,501 | 1/1980 | Fage | 244/110 B |
| 4,410,152 | 10/1983 | Kennedy et al. | 244/110 B |
| 4,485,970 | 12/1984 | Fournier et al. | 239/265.29 |
| 4,830,519 | 5/1989 | Starke | 60/226.2 |
| 4,860,956 | 8/1989 | Fage | 239/265.19 |
| 4,894,985 | 1/1990 | Dubois et al. | 60/226.2 |
| 4,922,715 | 5/1990 | Matta et al. | 239/265.29 |
| 4,930,307 | 6/1990 | Newton | 60/226.1 |
| 5,039,171 | 8/1991 | Lore | 239/265.29 |
| 5,209,432 | 5/1993 | Roberge et al. | 244/110 B |
| 5,224,342 | 7/1993 | Lair | 60/230 |
| 5,243,817 | 9/1993 | Matthias | 244/110 B |
| 5,267,438 | 12/1993 | Bunel et al. | 244/110 B |

FOREIGN PATENT DOCUMENTS

| | | |
|---|---|---|
| 0 489 277 | 6/1992 | European Pat. Off. . |
| 2 601 077 | 1/1988 | France . |

*Primary Examiner*—Virna Lissi Mojica
*Attorney, Agent, or Firm*—Young & Thompson

[57] ABSTRACT

The thrust reverser for a turbo-fan engine is comprised of: a plurality of doors located in openings radially spaced in a shroud enclosing the engine and canalizing the jet flow from the engine, the doors being adapted to be pivoted, within a fixed structure, from a stowed position, in which they do not interfere with the jet flow, to a deployed position in which they block the jet flow and deflect it through the openings; an actuator having a body attached to the fixed structure and a rod attached to the center of each pivoting door for moving the door from the stowed position to the deployed position, and vice versa; and sealing elements comprising a main seal provided on the fixed structure and a separate annular seal located around the actuator body, the sealing elements mating with each door, when in the stowed position, and with the fixed structure to prevent pressure leakage of the jet flow.

6 Claims, 4 Drawing Sheets

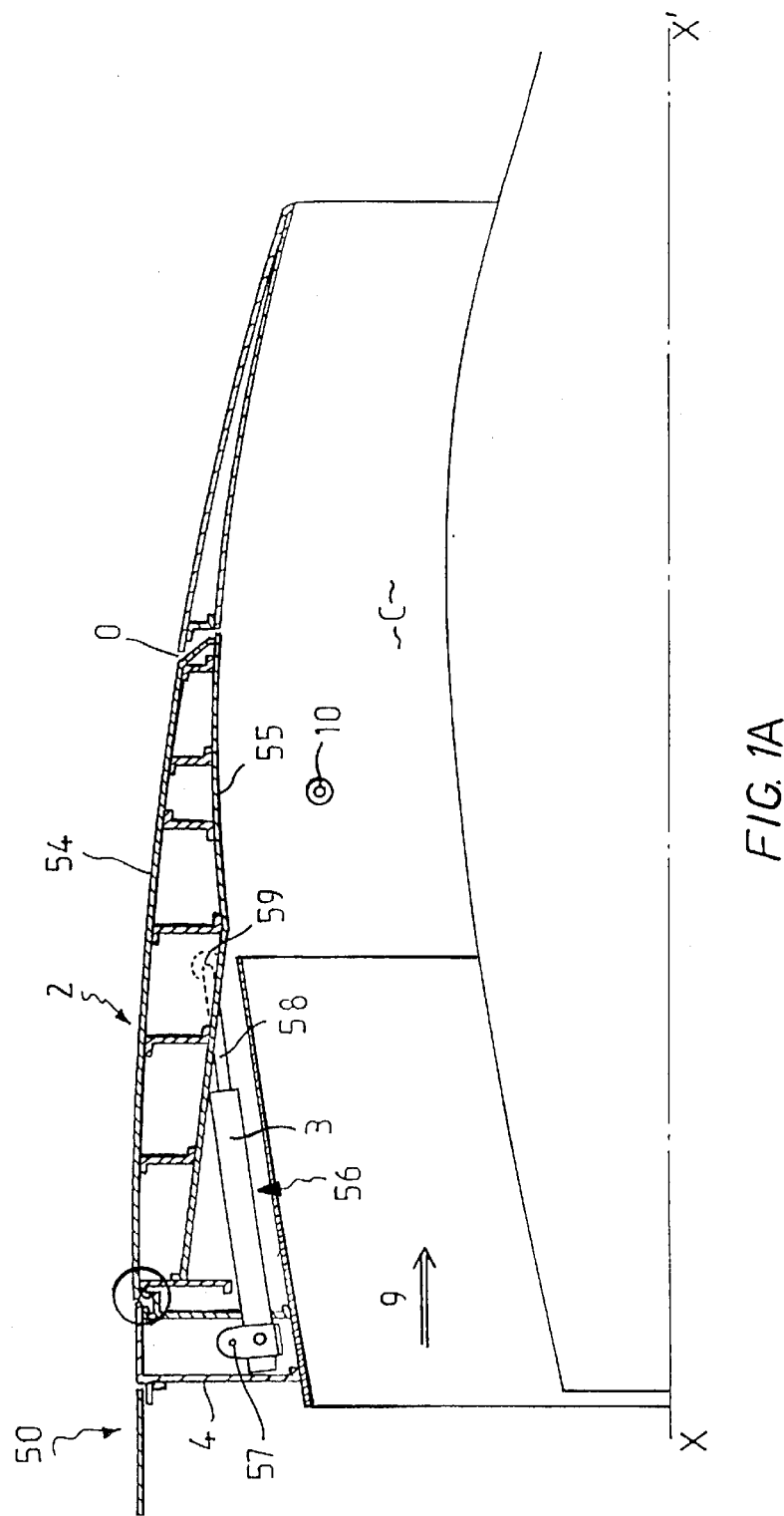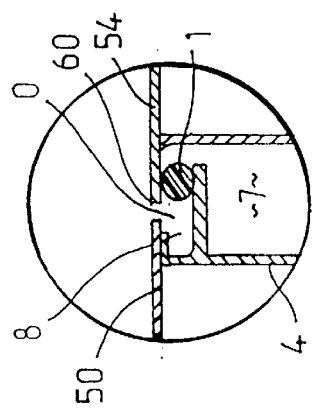

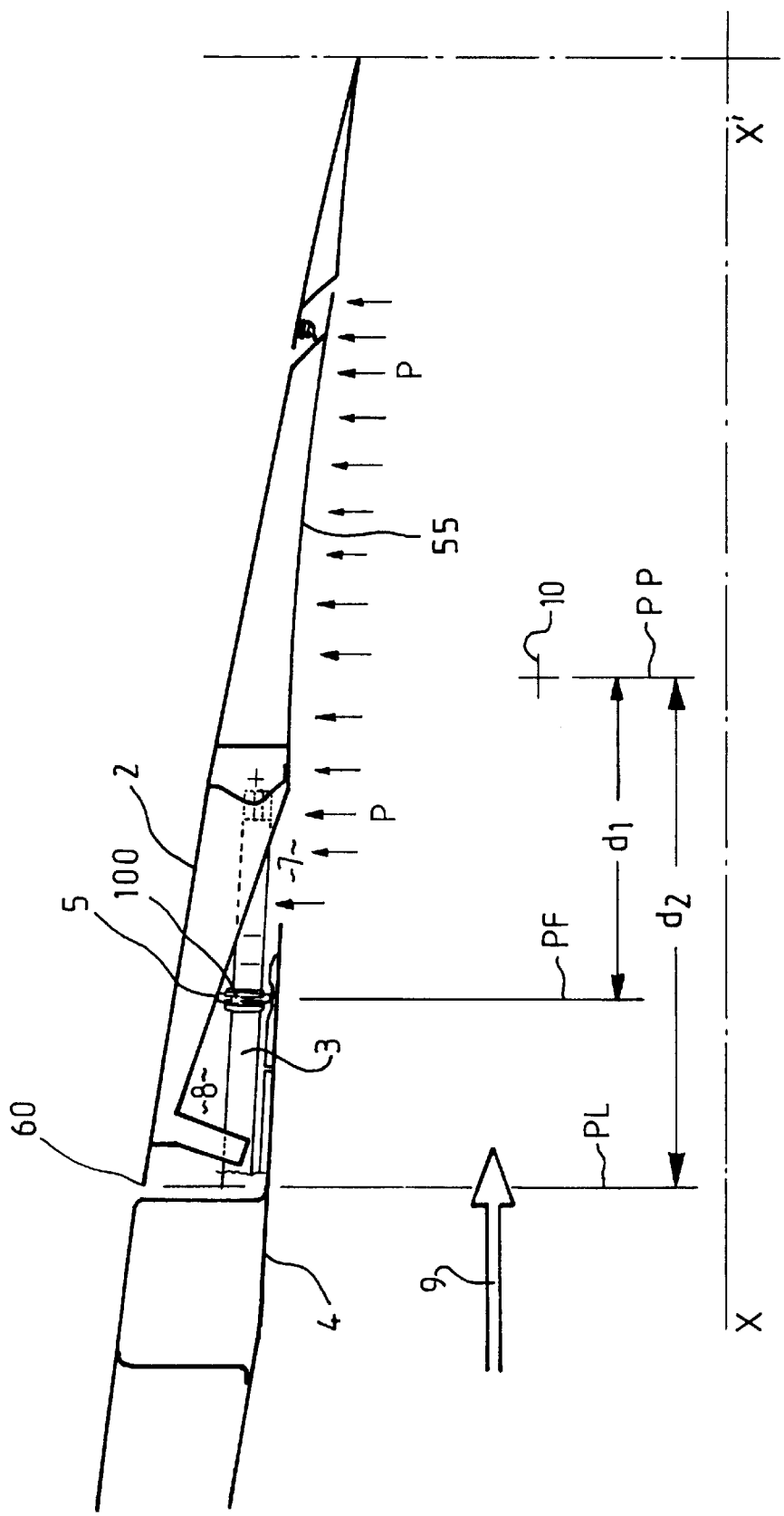

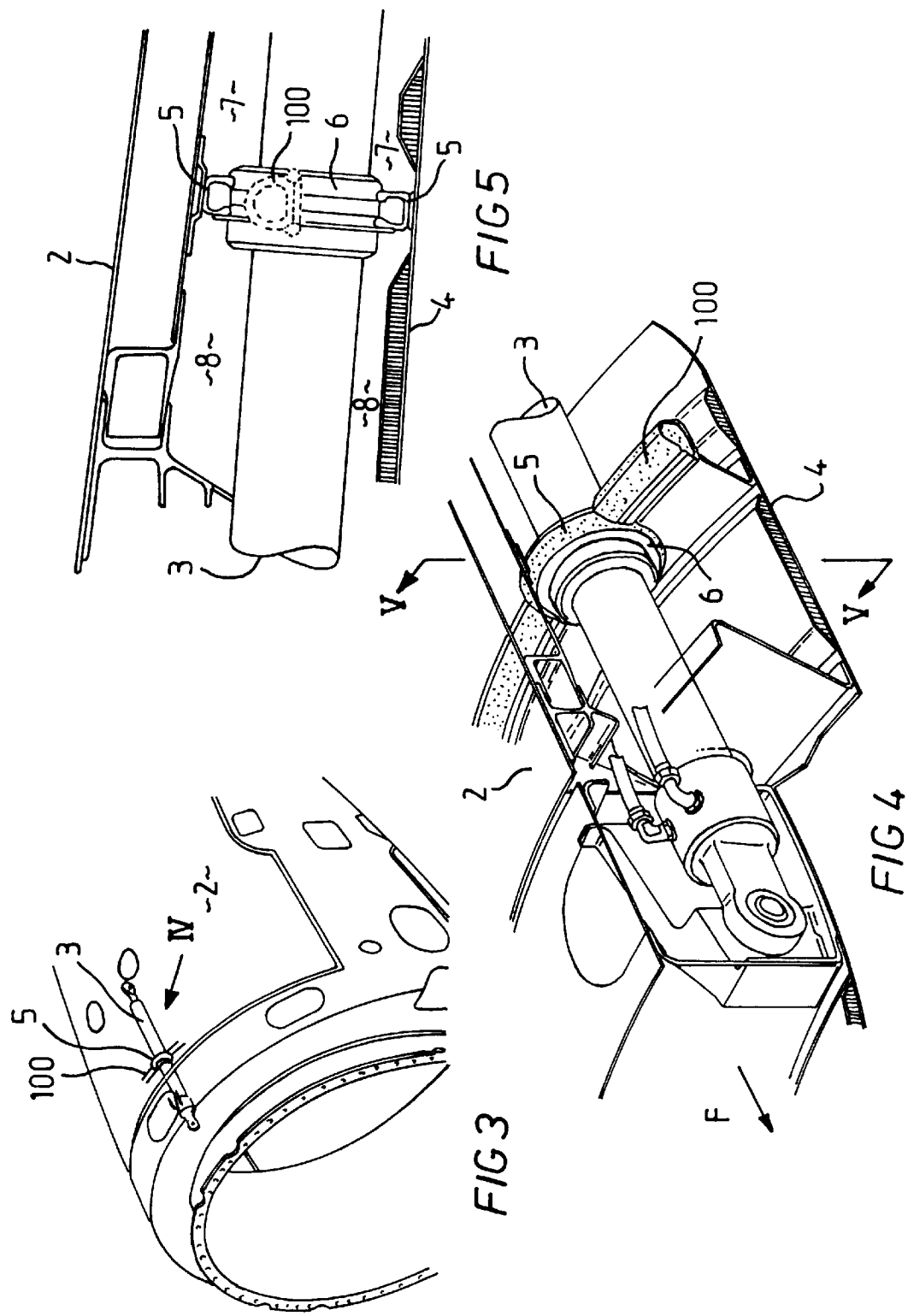

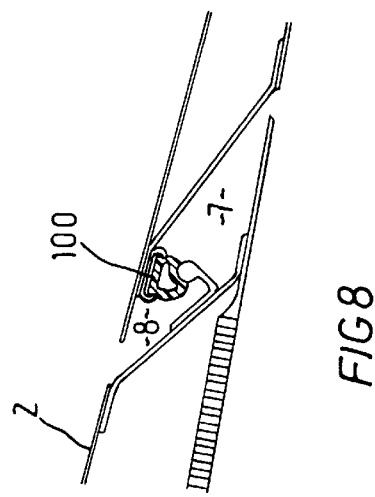
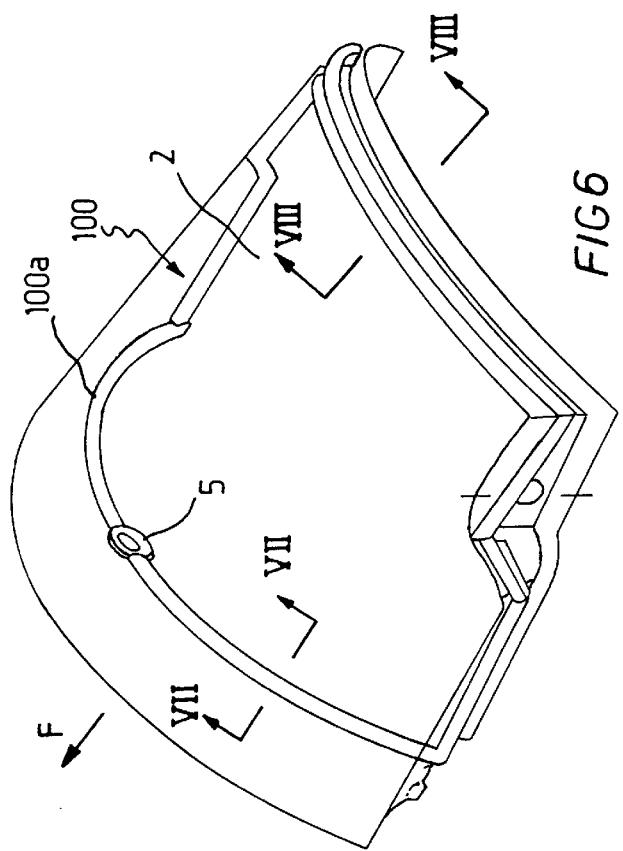
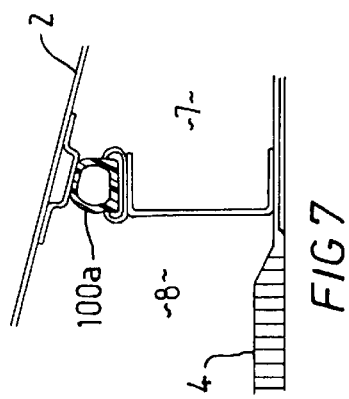

SEALING FOR A PIVOTING DOOR REVERSER

BACKGROUND OF THE INVENTION

The present invention relates to sealing for use with a thrust reverser for turbo-fan engines.

Thrust reversers are provided, on modern aircraft turbo-fan engines, to reduce the stopping distance of the aircraft and to increase safety when landing on a wet or icy runway.

The thrust reversers are each comprised of two or more pivoting doors that are mounted in openings provided in a shroud or nacelle which surrounds the engine and defines an annular passage for the jet flow from the engine, said doors being adapted to pivot about axes, from a stowed position to a deployed position.

In the stowed position, the doors form a portion of said shroud and do not interfere with said flow, so that the forward thrust of the engine is allowed to continue directly rearwards along said annular passage.

In the deployed position, the doors are pivoted about the pivot axis to block the flow and redirect it in a forward direction, thereby producing a breaking force to stop the aircraft.

The primary objective of the present invention is to provide complete sealing in the stowed position. More precisely, a seal is required between the pivoting doors and the fixed structure in order to prevent pressure leakage of the jet flow, thereby insuring high forward thrust performance.

The sealing design is particularly important to attain the optimum forward thrust performance.

A prior art thrust reverser system incorporating pivoting doors is shown in U.S. Pat. No. 4 485,970 Fournier. In this prior art system, the seal is installed on the periphery of the pivoting doors.

French patent No. 2 601 077 and U.S. Pat. No. 4,410,152, both in the name of Kennedy, show a seal installed on the fixed structure within which the doors are pivoted. More precisely, in French patent No. 2 601 077, a seal 20 is installed on an extension 18 of the inner skin of the shroud, at the forward end of the opening in which the door is mounted. Seal 20 is linked by seals 20a, provided on longitudinal beams, to a seal 17a installed on a ring which projects from the deflection well at the rearward end of the opening. In U.S. Pat. No. 4,410,152, sealing at the front of the door, in the stowed position, is provided by a seal 28 fixed to the front of an internal wall PI integral with the fixed structure. The position and size of seal 28 are such that said seal prevents leak of flow towards the front of the doors only.

The present invention is comprised of a main seal that is installed on the fixed structure with a separate annular seal that is installed around the actuator body. A housing around the actuator body provides a guide or track for the annular seal.

The forward part of the main seal is located considerably aft to reduce the load on the doors, by reducing the surface exposed to the static pressure of the jet flow. This is further explained in the detailed description of the invention.

SUMMARY OF THE INVENTION

The thrust reverser for a turbo-fan engine of the present invention is comprised of:

a plurality of doors located in openings radially spaced in a shroud, or nacelle, surrounding said engine and canalizing the jet flow from said engine, said doors being adapted to be pivoted, within a fixed structure, from a stowed position, in which they do not interfere with the jet flow, to a deployed position in which they block the jet flow and deflect it through said openings;

an actuator having a body attached to said fixed structure and a rod attached to the center of each pivoting door for moving the door from said stowed position to said deployed position, and vice versa;

sealing means which mate with each door, when in the stowed position, and with said fixed structure to prevent pressure leakage of said jet flow, wherein said sealing means comprises a main seal provided on said fixed structure and a separate seal located around said actuator body.

Preferably, a housing supporting the said separate seal is attached directly to the actuator body.

Generally speaking, the engine equipped with the thrust reverser has a longitudinal axis, each pivoting door has a leading edge, a trailing edge and a pivot point, and the seal assembly according to the invention has a compression interface with the said door in the stowed position thereof, said interface having a forward part proximal to said leading edge and a rear part distal to said leading edge. In a preferred embodiment, the distance between the pivot point plane, perpendicular to the engine axis, and a parallel plane containing said forward part of the compression interface is equal to, or less than, 70% —more preferably is about 50% —of the distance between said pivot point plane and a parallel plane containing said door leading edge.

The main seal of the present invention is installed on the thrust reverser fixed structure, and the stowed pivoting doors exert a compression effect on the seal. A principle design feature of the present invention is the annular seal incorporated around the actuator body, that is separate from the main seal. This separate seal and the aft location of the seal assembly relative to the pivoting door result in a reduction of pressure leakage of the jet flow.

BRIEF DESCRIPTION OF THE DRAWINGS

FIG. 1A is a partial, longitudinal cross-sectional view of a known door type thrust reverser with a seal mounted on the door.

FIG. 1B is an enlarged fragment of FIG. 1A.

FIG. 2 is a partial, longitudinal cross-sectional view of a door type thrust reverser according to the present invention.

FIG. 3 is a partial perspective view of the thrust reverser of FIG. 2.

FIG. 4 is an enlarged perspective view of the portion of FIG. 3 which shows, among others, the separate seal around the actuator body.

FIG. 5 is a cross-sectional view along line V—V of FIG. 4, showing the separate seal in compression against the pivoting door.

FIG. 6 is a perspective view of the pivoting door of the thrust reverser according to the present invention, showing the seal assembly installation on the structure under the door.

FIG. 7 is an enlarged cross-sectional view along line VII—VII of FIG. 6, showing the main seal in compression with the pivoting door forward zone.

FIG. 8 is an enlarged cross-sectional view along line VIII—VIII of FIG. 6, showing the main seal in compression with the pivoting door aft zone.

DETAILED DESCRIPTION OF PREFERRED EMBODIMENTS

In all figures, parts designated by the same reference are identical or equivalent parts. Arrow F indicates the forward direction of the aircraft.

FIG. 1A and 1B shows a thrust reverser configuration deriving from U.S. Pat. No. 4,485,970, referred to above.

X—X' indicates the engine axis and 50 a peripheral shroud or cowling surrounding the engine body. The shroud 50 delimits an annular passage or channel C in which flows a gas or jet flow 9 originating from an upstream fan (not shown) for example.

Pivoting doors, one of which is designated generally by 2, are articulated about axes 10 within a fixed structure 4 and consist of an outer skin 54 and of an inner skin 55. The pivoting doors 2 are each mounted in an opening O provided in shroud 50 and are intended, in a stowed position, to close said openings and to be extended in the continuation of the shroud 50, thereby completely freeing the annular passage C.

The stowed position of the doors 2 allows the thrust of the engine to continue directly rearwards, thereby providing the forward thrust of the aircraft.

A pressure seal 1 is located on the forward extremity, or leading edge 60, of the pivoting doors 2 to prevent jet flow leakage in the stowed position. The seal 1 creates a pressure barrier between zone 7 which is pressurized and zone 8 which is not.

An actuator 56, whose body 3 is articulated at 57 to the fixed structure 4 and whose rod 58 is articulated at 59 in the middle of the door 2, enables the latter to be pivoted about axis 10 from the stowed position to a deployed position, and vice versa.

In the deployed position, the doors 2 block the flow 9 and redirect it in a forward direction, through openings O, thereby producing a breaking force to stop the aircraft.

FIG. 2 shows a thrust reverser with a sealing assembly according to the present invention.

The seal assembly according to the invention includes a main pressure seal 100 installed on the thrust reverser fixed structure 4 and a separate annular seal 5 installed on the actuator body 3.

The shape of main seal 100 mates with that of the pivoting door 2 as shown by FIG. 6.

As shown in FIGS. 3, 4 and 5, the separate seal 5, which is preferably a bulbed shape silicone seal, surrounds the actuator body 3. A housing 6 supports the separate annular seal 5 and stabilizes its inner periphery, leaving the outer periphery of the annular seal 5 free to compress against the pivoting door 2. To allow movement of the actuator 56, the housing 6 is attached to the actuator body 3 so that, when the actuator 56 is removed for maintenance, the housing 6 and the supported annular seal 5 are removed simultaneously. The innovative design of the interfaces between the main seal 100 and separate seal 5, on the one hand, and the door 2, on the other hand, results in a complete pressure barrier from the pressurized zone 7 to the unpressurized zone 8 (FIGS. 1 and 5).

In order to further explain the shape and size of the main seal 100, relative to the separate annular seal 5, FIG. 6 shows an outline of the main seal 100 and the relative location of the separate seal 5. The main seal 100 has a forward part 100a located in the same plan PF (see FIG. 2) as the separate annular seal 5. The main seal 100 may either be terminated where it mates with the separate annular seal 5, or be continuous, in which case the separate annular seal will bear against the main seal 100 when the door is in the stowed position. When the main seal 100 is continuous, it can be provided with an appropriate recess in its contact area with the annular separate seal. It should be noted that the seal assembly 100, 5 is shown in order to illustrate its size and location relative to the pivoting door 2. In actuality, as already mentioned, the seal 100 is not attached to the door 2 but to the fixed structure 4 of the thrust reverser.

Referring now to FIGS. 7 and 8, typical cross-sections show the seal 100 in compression against the pivoting door 2. This compression effect provides a complete pressure barrier from the pressurized zone 7 to the unpressurized zone 8.

Comparing FIGS. 2 and 1, one can see that the seal 100, in FIG. 2, is located further aft than the seal 1 of the prior art structure as shown in FIG. 1. The distance $d_1$ between the pivot point plane PP, perpendicular to the engine axis X–X', and a parallel plane PF containing the forward part of the compression interface between the seal assembly 100, 5 and the door 2 is equal to, or less than, 70% —more preferably is about 50% —of the distance $d_2$ between said pivot point plane PP and a parallel plane PL containing said door leading edge 60. It can be seen that the jet flow 9 contacts the door inner skin 55, creating pressure P that results in load against the pivoting door 2.

Since the rotational moment acting on the pivot axis 10 is determined from the static pressure distribution of $d_1$ or $d_2$, one skilled in the art will understand that the $d_1$ seal assembly location results in proportionately lower loads on the pivoting doors.

What we claim is:

1. A thrust reverser for a turbo-fan engine comprised of:
   a plurality of doors located in openings radially spaced in a shroud enclosing said engine and canalizing the jet flow from said engine, said doors being adapted to be pivoted, within a fixed structure, from a stowed position, in which they do not interfere with the jet flow, to a deployed position in which they block the jet flow and deflect it through said openings;
   an actuator for each pivoting door, each actuator having a body attached to said fixed structure and a rod attached to the center of a respective pivoting door for moving the door from said stowed position to said deployed position, and vice versa;
   sealing means which mate with each door, when in the stowed position, and with said fixed structure to prevent pressure leakage of said jet flow,
   wherein said sealing means comprise a main seal provided on said fixed structure and a separate annular seal located around said actuator body.

2. The thrust reverser according to claim 1, wherein a housing supporting said separate seal is attached directly to the actuator body.

3. The thrust reverser according to claim 1 or 2, in which the engine has a longitudinal axis, each door has a leading edge, a trailing edge and a pivot point, and said sealing means has a compression interface with said door in the stowed position thereof, said interface having a forward part proximal to said leading edge and a rear part distal to said leading edge,
   wherein the distance between the pivot point plane, perpendicular to the engine axis, and a parallel plane containing said forward part of the compression interface is equal to, or less than, 70% of the distance between said pivot point plane and a parallel plane containing said door leading edge.

4. The thrust reverser according to claim 1, in which the engine has a longitudinal axis, each door has a leading edge, a trailing edge and a pivot point, and said sealing means has a compression interface with said door in the stowed position thereof, said interface having a forward part proximal to said leading edge and a rear part distal to said leading edge, wherein the distance between the pivot point plane, perpendicular to the engine axis, and a parallel plane containing said forward part of the compression interface is about 50% of the distance between said pivot point plane and a parallel plane containing said door leading edge.

5. The thrust reverser according to claim 1, in which the engine has a longitudinal axis, each door has a leading edge, a trailing edge and a pivot point, and said sealing means has a compression interface with said door in the stowed position thereof, said interface having a forward part proximal to said leading edge and a rear part distal to said leading edge, wherein the distance between the pivot point plane, perpendicular to the engine axis, and a parallel plane containing said forward part of the compression interface is equal to, or less than, 70% of the distance between said pivot point plane and a parallel plane containing said door leading edge.

6. The thrust reverser according to claim 2, in which the engine has a longitudinal axis, each door has a leading edge, a trailing edge and a pivot point, and said sealing means has a compression interface with said door in the stowed position thereof, said interface having a forward part proximal to said leading edge and a rear part distal to said leading edge, wherein the distance between the pivot point plane, perpendicular to the engine axis, and a parallel plane containing said forward part of the compression interface is about 50% of the distance between said pivot point plane and a parallel plane containing said door leading edge.

* * * * *